United States Patent
Kim et al.

(10) Patent No.: US 7,917,343 B2
(45) Date of Patent: Mar. 29, 2011

(54) RIPPLE AND FOAM CREATION APPARATUS AND METHOD USING FLUID PARTICLE DATA

(75) Inventors: Janghee Kim, Seoul (KR); Bon Ki Koo, Daejon (KR); Man Jai Lee, Seoul (KR)

(73) Assignee: Electronics and Telecommunications Research Institute, Daejon (KR)

( * ) Notice: Subject to any disclaimer, the term of this patent is extended or adjusted under 35 U.S.C. 154(b) by 526 days.

(21) Appl. No.: 11/944,697

(22) Filed: Nov. 26, 2007

(65) Prior Publication Data
US 2008/0133191 A1    Jun. 5, 2008

(30) Foreign Application Priority Data

Dec. 4, 2006 (KR) .................. 10-2006-0121358
Jul. 24, 2007 (KR) .................. 10-2007-0074065

(51) Int. Cl.
*G06F 17/50* (2006.01)
(52) U.S. Cl. .................. 703/2; 703/9; 703/12
(58) Field of Classification Search .................. 703/2, 9, 703/7, 12; 345/652, 653, 581
See application file for complete search history.

(56) References Cited

U.S. PATENT DOCUMENTS

| | | | |
|---|---|---|---|
| 2006/0059922 A1* | 3/2006 | Anderson et al. | 62/93 |
| 2007/0043544 A1* | 2/2007 | Song et al. | 703/9 |
| 2010/0001231 A1* | 1/2010 | Loukus et al. | 252/182.12 |

FOREIGN PATENT DOCUMENTS

WO    WO98/43179    10/1998

OTHER PUBLICATIONS

Jeong-Mo Hong, et al; "Animation of Bubbles in Liquid;" Eurographics 2003/ P.Brunet and D.Fellner, vol. 22(2003), No. 3.
Adam W. Bargteil, et al; "A Texture Synthesis Method for Liquid Animations;" Eurographics/ACM SIGGRAPH Symposium on Computer Animation (2006) M.-P.Cani, J.O'Brien(Editors).

* cited by examiner

*Primary Examiner* — Thai Phan
(74) *Attorney, Agent, or Firm* — Ladas & Parry LLP

(57) ABSTRACT

A ripple and foam creation apparatus and method using water particle data is provided to create ripples and foam, and detect positions of the created ripples and foam for a water simulation used to create visual special effects in animations or movies. The apparatus includes a water particle grouping module checking grouping types of water particles from received water particle data to selects small water masses, a ripple creation module determining a position for ripple creation by using the checked grouping types, a foam creation module detecting flow of the water particles and calculating a position for foam creation, and a ripple-foam moving/removing module detecting changes of the created foam and ripples over time and removing the created foam and ripples.

16 Claims, 2 Drawing Sheets

RIPPLE AND FOAM CREATION APPARATUS AND METHOD USING FLUID PARTICLE DATA

BACKGROUND OF THE INVENTION

1. Field of the Invention

The present invention relates to a ripple and foam creation apparatus and method using fluid particle data, and more particularly, to an apparatus and method for representing a more detailed result of a water simulation for animations or movies by analyzing water particle data, creating ripples using the water particle data, creating foam using information of particle speeds and a curvature of a water surface included in the water particle data, and moving and removing the created ripples and foam over time.

2. Description of the Related Art

Researches on fluids such as water and gases have been actively conducted in various fields. Particularly, hydrodynamics, as well as graphics, is being applied to the visual industry in various manners, and its application range is also expanding.

However, even if the hydrodynamics is used, it is still difficult to create complicated natural phenomena. This is because most of systems are controlled by solutions of complicated equations and parameters corresponding to a specific situation.

Thus, because of properties of fluid that can variously react even to subtle changes of surroundings, it is not easy to precisely model and simulate fluid flow into a desired form. In computer graphics it is difficult, yet interesting to represent irregular natural phenomena such as water movements, gas flow, and shape changes of cloud.

As water expression has recently been considered important in various movies and animations, many technologies associated with the water expression are being developed. However, most of the technologies are merely about water movements or interactions with other objects under limited conditions, and the latest technology is merely on a simulation of droplet movements on a surface of an object. Since details in many parts of the water expression fail to meet users' demands, there are many difficulties in producing an animation.

SUMMARY OF THE INVENTION

Accordingly, the present invention is directed to a ripple and foam creation apparatus and method using water particle data, which substantially obviates one or more problems due to limitations and disadvantages of the related art.

It is an object of the present invention to provide a ripple and foam creation apparatus and method for creating on a water surface, ripples and foam that an existing fluid simulation cannot easily create, and representing natural flow of the created ripples and foam.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a ripple and foam creation apparatus using water particle data for representing ripples and foam on a water surface upon receiving water particle data including position and speed information of water particles from an external three-dimensional fluid simulator, characterized in that the apparatus detects a water particle structure using the received position information of the water particles to create ripples, calculates a curvature of the water surface using the received position and speed information of the water particles to create foam, and moves and removes the created ripples and foam over time.

The apparatus may include: a water particle grouping module grouping water particles into water particle groups for each predetermined distance by using the received position information, classifying the water particle groups into main water masses and small droplets according to sizes of the water particle groups, and detecting distribution of the grouped water particles; a ripple creation module creating ripple particles at a position at which the main water mass and the small droplet are combined, by using the distribution of the grouped water particles; a foam creation module calculating a curvature of a water surface on which the water particles are placed by using the position information of the water particles, and creating foam particles by using speed-change information of the water particles and the curvature of the water surface; and a ripple-foam moving/removing module calculating flow variations of water particles adjacent to the created ripple and foam particles, and moving the created ripple and foam particles corresponding to the calculated flow variations.

In another aspect of the present invention, there is provided a ripple and foam creation method using water particle data for representing ripples and foam on a water surface upon receiving water particle data including position and speed information of water particles from an external three-dimensional (3D) fluid simulator, includes the steps of: a) detecting distribution of water particles by using the received position information of the water particles; b) creating ripple particles by using the distribution of the water particles; c) creating foam particles by using the received position and speed information of the water particles; and d) detecting flow of water particles adjacent to the created ripple and foam particles over time to move the created ripple and foam particles.

Also, the distribution detecting step a) may include the steps of: a1) detecting distribution of water particles by using the position information of the water particles; a2) grouping the water particles into water particle groups according to the detected distribution; and a3) classifying the water particles groups into main water masses and small droplets according to sizes of the water particles groups.

The ripple particle creating step b) may include the steps of: b1) checking whether water particles classified as the small droplet are detected in another water particle group; and b2) determining that the small droplet is combined with the main water mass, when the water particles are detected in another water particle group.

The foam particle creating step c) may include the steps of: c1) selecting water particles having a rapidly changing speed as foam creation candidates; c2) checking each of positions of the water particles selected as the foam creation candidates to determine whether the water particles selected as the foam creation candidates are placed on a water surface; c3) calculating a curvature of the water surface at each of the positions of the water particles selected as the foam creation candidates, when the water particles selected as the foam creation candidates are placed on the water surface; c4) detecting whether the water surface on which the water particles selected as the foam creation candidates are placed is flat or not on the basis of the calculated curvature of the water surface; and c5) creating foam particles at a position on the water surface where the water particles selected as the foam creation candidates are placed, when it is determined that the water surface is not flat.

The ripple and foam moving step d) may include the steps of: d1) detecting water particles adjacent to a position at which the ripple particles and the foam particles are created; d2) connecting the detected water particles with the created ripple particles and the foam particles; d3) measuring flow variations of the connected water particles and calculating a weighted average of the flow variations; and d4) moving the created ripple particles and the foam particles corresponding to the calculated weighted average.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
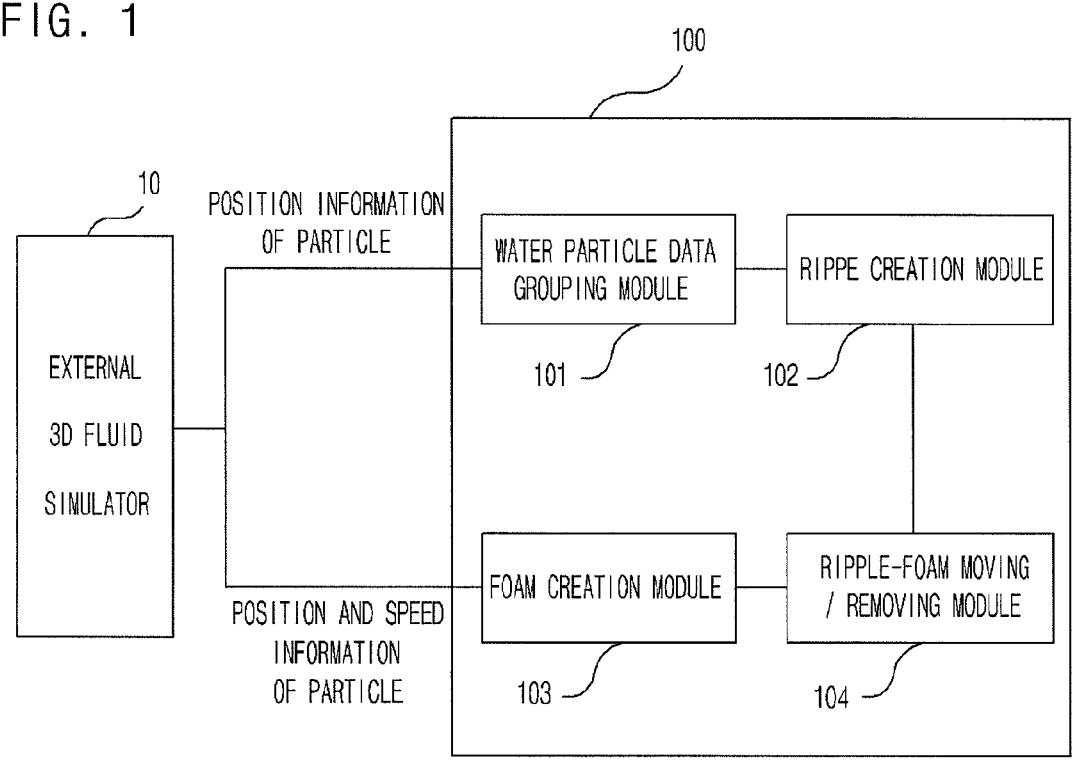
FIG. 1 is a block diagram illustrating a configuration of a ripple and foam creation apparatus using water particle data according to an embodiment of the present invention.

FIG. 1 is a block diagram illustrating a configuration of a ripple and foam creation apparatus using water particle data according to an embodiment of the present invention. The present invention relates to representing generation, movements, and disappearance of small ripples and foam on a water surface.

Referring to FIG. 1, a ripple and foam creation apparatus 100 using water particle data includes a water particle grouping module 101, a ripple creation module 102, a foam creation module 103, and a ripple-foam moving/removing module 104.

Specifically, the water particle grouping module 101 receives a result of a three-dimensional (3D) fluid simulation using an external 3D fluid simulation tool, that is, position and speed information of water particles.

The water particle grouping module 101 detects distribution of water particles from the position information of water particles, detects grouping types of the water particles, and thus groups the water particles into one or more main water masses and small droplets according to sizes of water particle groups.

Information of the water particle groups classified by the water particle grouping module 101 and the distribution of water particles belonging to each water particle group is used to determine a position at which the ripple creation module 102 creates ripples.

In nature, water droplets fall on the surface of water, making ripples. The ripple creation module 102 creates ripple particles by simulating this natural phenomenon. In detail, when water particles grouped as a small droplet by the water particle grouping module 101 is detected in another water particle group, the ripple creation module 102 determines that the small droplet is combined with a main water mass.

Since in nature ripples are made at the time of this combination, the ripple creation module 102 captures a position at which the combination of the small droplet with the main water mass occurs, and creates ripple particles at the corresponding position. That is, the ripple creation module 102 determines a position to create a ripple particle by checking positions of water particles using the distribution information of the water particles grouped into the main water mass and the small droplets, and then creates the ripple particles at the determined position.

The foam creation module 103 creates foam particles using particle-speed information as well as the particle-position information. In nature, the foam is often created when water flow rapidly changes. Thus, the foam creation module 103 creates the foam particles by simulating this natural phenomenon.

Specifically, the foam creation module 103 receives a result of a 3D fluid simulation using an external 3D fluid simulation tool, that is, position and speed information of water particles, and calculates a proper position to create foam in due consideration of changes in positions and speeds of these water particles.

The foam creation module 103 selects water particles whose speeds rapidly change as foam creation candidates. The foam creation module 103 checks respective positions of the selected water particles to determine whether the water particles are currently on the surface of water. If the water particles are on the surface of water, the foam creation module 103 calculates a curvature of the water surface, and determines based on the calculated curvature whether the current water surface is flat or not. If the water particles are on the water surface, and the water surface is not flat, the foam creation module 103 creates foam particles at the corresponding position.

The ripple-foam moving/removing module 104 serves for natural movements and disappearance of ripple and foam particles respectively created by the ripple creation module 102 and the foam creation module 103. To achieve natural flow of the created ripple and foam particles, the ripple-foam moving/removing module 10 detects adjacent water particles to a position at which the ripple and foam particles are created, and connects the detected water particles to the created ripple and foam particles.

The ripple-foam moving/removing module 104 detects the current flow of the water particles connected to the ripple and foam particles, and calculates a weighted average of position variations according to the detected flow of the water particles connected to the ripple and foam particles. Then, the ripple-foam moving/removing module 104 moves the created ripple and foam particles, corresponding to the calculated weighted average of the position variations. The ripple-foam moving/removing module 104 removes the created ripple and foam particles after a predetermined time elapses.

However, the predetermined time to make the ripple and foam particles disappear does not have to be set precisely, and the time for the disappearance may be set statistically by utilizing proper distribution so that randomness of nature can be represented.

Figure 2:
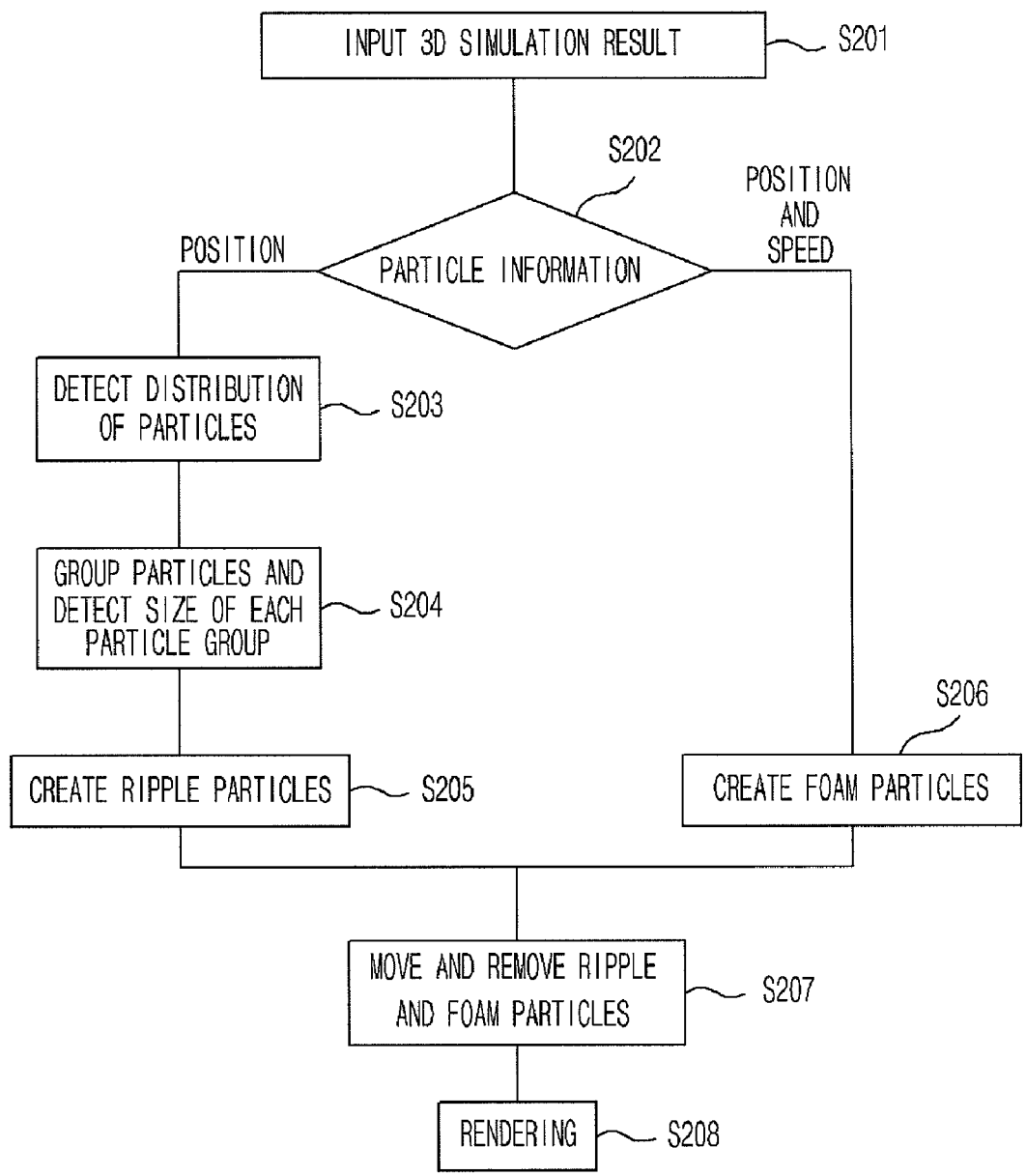
FIG. 2 is a flowchart illustrating an operational process of the ripple and foam creation apparatus using water particle data according to an embodiment of the present invention.

FIG. 2 is a flowchart illustrating an operational process of the ripple and foam creation apparatus using water particle data.

An operational process of the ripple and foam creation apparatus 100 using water particle data according to an embodiment of the present invention will now be described with reference to FIG. 2. In step S201, information of water particles of each frame, that is, water particle data including position and speed information of the water particles is input from an external 3D fluid simulator.

In steps S202 and S203, the water particle grouping module 101 detects distribution of water particles using the input position information of water particles. In step S204, the water particle grouping module 101 detects grouping types of the water particles.

That is, in step S204, the water particle grouping module 101 detects distribution of all the water particles. Thus, the water particle grouping module 101 groups water particles for each predetermined distance, and estimates the size of each water particle group.

Thereafter, the water particle grouping module 101 classifies water groups having a size less than a predetermined size as small droplets separated from a main water mass. That is, the water particle groups are classified into one or more main water masses and one or more small droplets according to their sizes. The information classified by the water particle grouping module 101 is used in the ripple creation module 102.

In step S205, the ripple creation module 102 detects whether water particles grouped as a small droplet by the water particle grouping module 101 are combined with the main water mass, using the position information of the water particles. When the combination occurs, the ripple creation module 102 determines that the droplet falls on the water surface and thus creates ripple particles at a corresponding position.

In step S206, the foam creation module 102 creates foam particles, using the speed and position information input from the external 3D simulator in step S202.

In nature, foam creation is observed when the flow of water changes rapidly. To create such a natural phenomenon, the foam creation module 103 detects water particles the current speed of which changes rapidly as compared to the previous speed thereof.

In step S206, the foam creation module 103 checks whether water particles having a rapidly changing speed are placed on the water surface using the position information of the water particles. When the water particles are placed on the water surface, the curvature of the water surface is calculated. Thereafter, when it is determined using the calculated curvature that the water surface on which the water particles having the rapidly changing speed are placed is curved, the foam creation module 103 creates foam at a corresponding position.

In step S207, the foam-ripple moving/removing module 104 connects the created ripple and foam particles with adjacent water particles, then detects the flow of the adjacent water particles, calculates a weighted average of flow variations of the adjacent water particles, and then moves the ripple and foam particles corresponding to the calculated weighted average.

Also, in step S207, in order to create the natural phenomenon of expansion and disappearance of ripples and breaking of foam over time, the ripple-foam moving/removing module 104 sets lifespans for the ripple and foam particles statistically by using proper distribution, and checks the set lifespans to remove ripple and foam particles having reached their lifespans.

The invention can also be embodied as computer-readable program stored on a computer-readable recording medium. Examples of the computer-readable recording medium include CD-ROMs, random-access memory (RAM), read-only memory (ROM), floppy disks, hard disks, and magneto-optic data storage devices.

As described so far, in the ripple and foam creation apparatus and method using water particle data, details on the water surface such as ripples and foam, which cannot be easily created by an existing fluid simulation method, are created using a fluid simulation result, so that detailed and ample expression can be achieved in a scene where water appears. Accordingly, various realistic water scenes can be made, thereby contributing to production of detailed and vivid animations.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A ripple and foam creation apparatus using water particle data for representing ripples and foam on a water surface upon receiving water particle data including position and speed information of water particles from an external three-dimensional fluid simulator, wherein the apparatus detects a water particle structure using the received position information of the water particles to create ripples, calculates a curvature of the water surface using the received position and speed information of the water particles to create foam, and moves and removes the created ripples and foam over time, the apparatus comprises:

a water particle grouping module grouping water particles into water particle groups for each predetermined distance by using the received position information, classifying the water particle groups into main water masses and small droplets according to sizes of the water particle groups, and detecting distribution of the grouped water particles;

a ripple creation module creating ripple particles at a position at which the main water mass and the small droplet are combined, by using the distribution of the grouped water particles;

a foam creation module calculating a curvature of a water surface on which the water particles are placed by using the position information of the water particles, and creating foam particles by using speed-change information of the water particles and the curvature of the water surface; and a ripple-foam moving/removing module calculating flow variations of water particles adjacent to the created ripple and foam particles, and moving the created ripple and foam particles corresponding to the calculated flow variations.

2. The apparatus of claim 1, wherein the water particle grouping module classifies the water particle groups into main water masses and small droplets, and classifies a water particle group smaller than a predetermined size as a droplet separated from the main water mass.

3. The apparatus of claim 1, wherein when the water particles classified as the small droplet are detected in the main water mass, the ripple creation module determines that the main water mass and the small droplet are combined together, and creates the ripple particles.

4. The apparatus of claim 1, wherein the foam creation module collects position information of water particles having a rapidly changing speed as compared to a previous speed thereof, checks whether the water particles of the collected information are placed on a water surface, calculates a curvature of the water surface when the water particles are placed on the water surface, and creates the foam particles when it is determined from the curvature that the water surface is curved.

5. The apparatus of claim 1, wherein the ripple-foam moving/removing module connects the created ripple and foam particles with adjacent water particles, measures flow variations of the adjacent water particles, and calculates a weighted average of the flow variations to move the ripple and foam particles corresponding to the calculated weighted average.

6. A ripple and foam creation method using water particle data for representing ripples and foam on a water surface upon receiving water particle data including position and speed information of water particles from an external three dimensional (3D) fluid simulator, the method comprising the steps of:
   a) detecting distribution of water particles by using the received position information of the water particles;
   b) creating ripple particles by using the distribution of the water particles;
   c) creating foam particles by using the received position and speed information of the water particles, and
      c1) selecting water particles having a rapidly changing speed as foam creation candidates;
      c2) checking each of positions of the water particles selected as the foam creation candidates to determine whether the water particles selected as the foam creation candidates are placed on a water surface;
      c3) calculating a curvature of the water surface at each of the positions of the water particles selected as the foam creation candidates, when the water particles selected as the foam creation candidates are placed on the water surface;
      c4) detecting whether the water surface on which the water particles selected as the foam creation candidates are placed is flat or not on the basis of the calculated curvature of the water surface; and
      c5) creating foam particles at a position on the water surface where the water particles selected as the foam creation candidates are placed, when it is determined that the water surface is not flat; and
   d) detecting flow of water particles adjacent to the created ripple and foam particles over time to move the created ripple and foam particles.

7. The method of claim 6, wherein the distribution detecting step a) comprises the steps of:
   a1) detecting distribution of water particles by using the position information of the water particles;
   a2) grouping the water particles into water particle groups according to the detected distribution; and
   a3) classifying the water particles groups into main water masses and small droplets according to sizes of the water particles groups.

8. The method of claim 7, wherein the ripple creating step b) comprises the steps of:
   b1) checking whether water particles classified as the small droplet are detected in another water particle group; and
   b2) determining that the small droplet is combined with the main water mass when the water particles are detected in another water particle group.

9. A computer-readable recording medium having a program for executing the method of claim 8, the computer-readable recording medium being at least one selected from the group consisting of CD-ROMs, random-access memory (RAM), read-only memory (ROM), floppy disks, hard disks, and magneto-optic data storage devices.

10. A computer-readable recording medium having a program for executing the method of claim 7, the computer-readable recording medium being at least one selected from the group consisting of CD-ROMs, random-access memory (RAM), read-only memory (ROM), floppy disks, hard disks, and magneto-optic data storage devices.

11. The method of claim 6, wherein the ripple and foam moving step d) comprises the steps of:
   d1) detecting water particles adjacent to a position at which the ripple particles and the foam particles are created;
   d2) connecting the detected water particles with the created ripple particles and the foam particles;
   d3) measuring flow variations of the connected water particles and calculating a weighted average of the flow variations; and
   d4) moving the created ripple particles and the foam particles corresponding to the calculated weighted average.

12. A computer-readable recording medium having a program for executing the method of claim 11, the computer-readable recording medium being at least one selected from the group consisting of CD-ROMs, random-access memory (RAM), read-only memory (ROM), floppy disks, hard disks, and magneto-optic data storage devices.

13. The method of claim 6, wherein the ripple and foam moving step d) further comprises the steps of:
   d5) setting lifespans for the created ripple particles and the created foam particles statistically by utilizing proper distribution, and removing the ripple particles and the foam particles having reached their lifespans.

14. A non-transitory computer-readable recording medium having a program for executing the method of claim 13, the computer-readable recording medium being at least one selected from the group consisting of CD-ROMs, random-access memory (RAM), read-only memory (ROM), floppy disks, hard disks, and magneto-optic data storage devices.

15. A computer-readable recording medium having a program for executing the method of claim 6, the computer-readable recording medium being at least one selected from the group consisting of CD-ROMs, random-access memory (RAM), read-only memory (ROM), floppy disks, hard disks, and magneto-optic data storage devices.

16. A computer-readable recording medium having a program for executing the method of claim 6, the computer-readable recording medium being at least one selected from the group consisting of CD-ROMs, random-access memory (RAM), read-only memory (ROM), floppy disks, hard disks, and magneto-optic data storage devices.

* * * * *